United States Patent [19]

Ikeda et al.

[11] Patent Number: 5,753,866
[45] Date of Patent: May 19, 1998

[54] COMBINATIONAL WEIGHER

[75] Inventors: Tetsuo Ikeda; Yukio Wakasa; Tohru Morichi, all of Shiga, Japan

[73] Assignee: Ishida Co., Ltd., Shiga, Japan

[21] Appl. No.: 545,780

[22] PCT Filed: May 15, 1995

[86] PCT No.: PCT/JP95/00926

§ 371 Date: Jun. 24, 1996

§ 102(e) Date: Jun. 24, 1996

[87] PCT Pub. No.: WO95/31702

PCT Pub. Date: Nov. 23, 1995

[30] Foreign Application Priority Data

May 13, 1994 [JP] Japan ................. 6-124611

[51] Int. Cl.⁶ .............. G01G 3/00; G01G 13/00; G01G 13/02; B65G 43/00
[52] U.S. Cl. .......... 177/25.18; 177/119; 177/121; 177/145; 901/46; 382/141; 364/478.06; 209/939; 222/55; 198/502.2
[58] Field of Search ............. 395/94; 901/46, 901/47; 382/141; 364/478.01, 478.06; 222/55; 209/577, 587, 938, 939; 177/25.18, 116, 119, 145, 121; 198/502.2

[56] References Cited

U.S. PATENT DOCUMENTS

| | | | |
|---|---|---|---|
| 3,944,049 | 3/1976 | Graybill | 198/502.2 |
| 4,344,520 | 8/1982 | Czoch et al. | 198/502.2 |
| 4,534,428 | 8/1985 | Mosher et al. | 177/121 |
| 4,615,403 | 10/1986 | Nakamura | 177/25.18 |
| 4,762,252 | 8/1988 | Hyer et al. | 177/121 X |
| 4,962,538 | 10/1990 | Eppler et al. | 382/141 |
| 5,224,811 | 7/1993 | Sigrist et al. | 901/46 |
| 5,270,495 | 12/1993 | Mosher et al. | 177/25.18 |
| 5,444,749 | 8/1995 | Nambu | 177/25.18 X |
| 5,465,825 | 11/1995 | Levaro et al. | 198/502.2 |
| 5,481,619 | 1/1996 | Schwartz et al. | 382/141 |

FOREIGN PATENT DOCUMENTS

| | | |
|---|---|---|
| 4-247273 | 9/1992 | Japan . |
| 4-285823 | 10/1992 | Japan . |
| 5-180686 | 7/1993 | Japan . |
| 5-54051 | 8/1993 | Japan . |
| 6-43012 | 2/1994 | Japan . |
| 6-74814 | 3/1994 | Japan . |

Primary Examiner—Michael L. Gellner
Assistant Examiner—Randy W. Gibson
Attorney, Agent, or Firm—Keiichi Nishimura

[57] ABSTRACT

A combinational weigher measures articles with a plurality of measuring devices and selects a combination of the articles with a total weight within an allowable range. The weigher has a device for supplying the articles, cameras for taking pictures of at least either this article supplying device or the articles thereon, an image processing device for determining the condition of the article supply on the basis of image signals from the cameras, a predicting device for predicting the change in the amount of the supplied articles on the basis at least of the condition thus determined, and a control device for changing the operating conditions of the supplying device on the basis of this prediction so as to control changes in the supply rates of articles to the measuring devices.

18 Claims, 11 Drawing Sheets

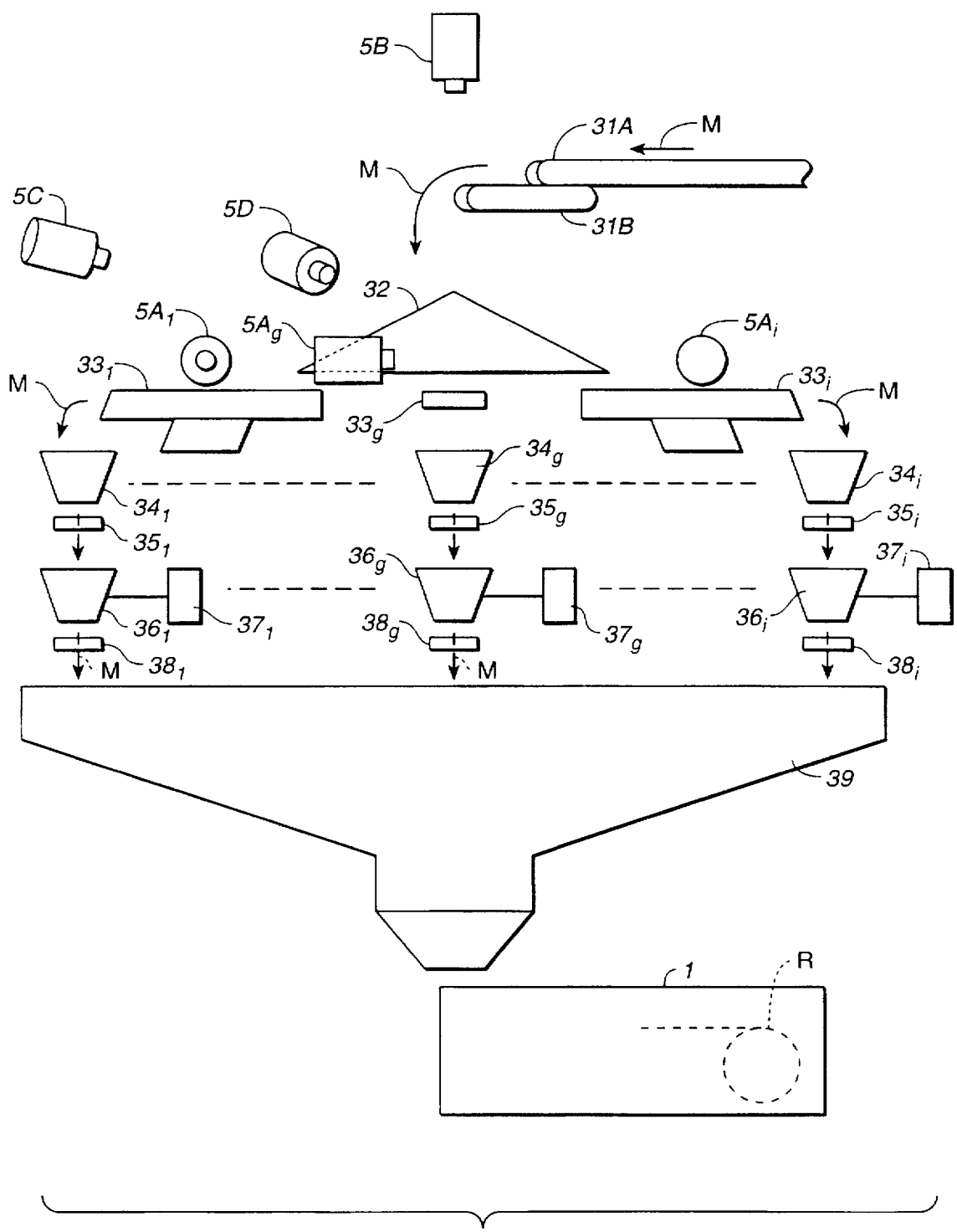
FIG._1

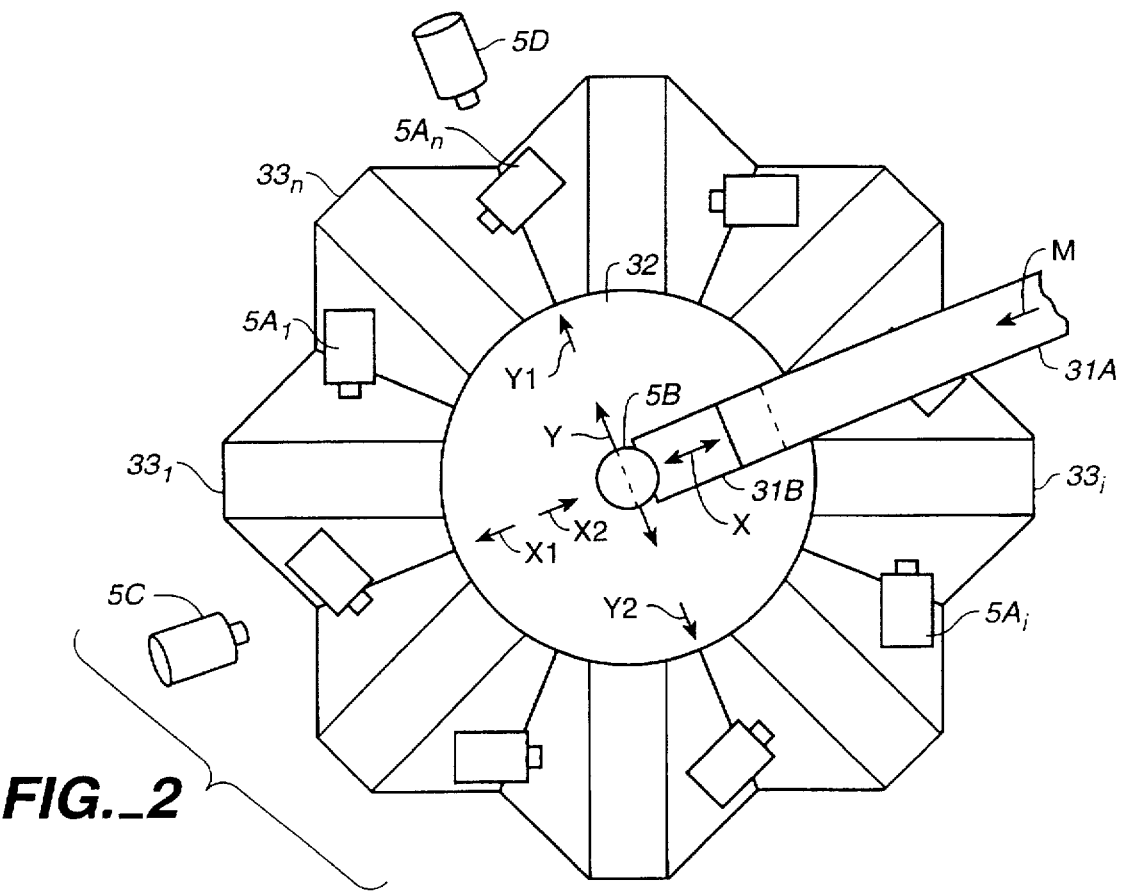
FIG._2
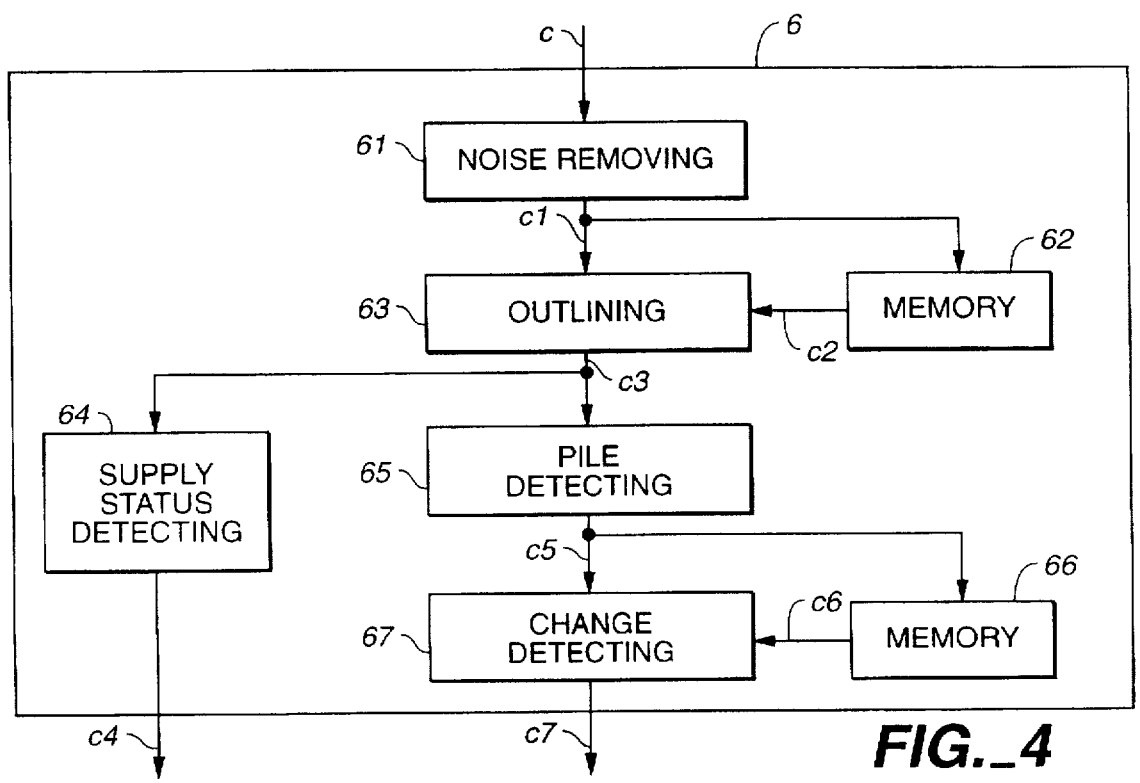
FIG._4

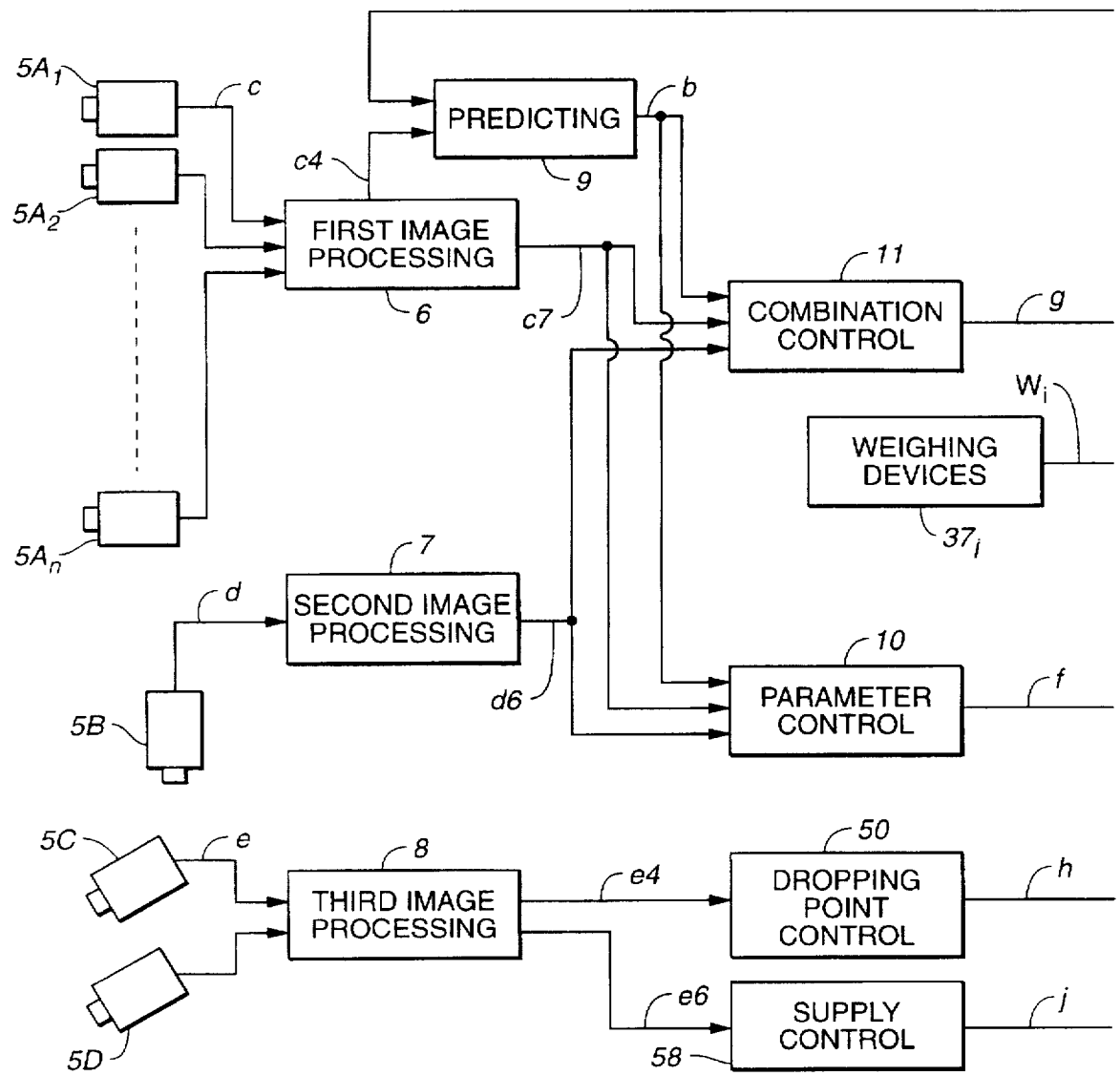
FIG._3A
FIG._3

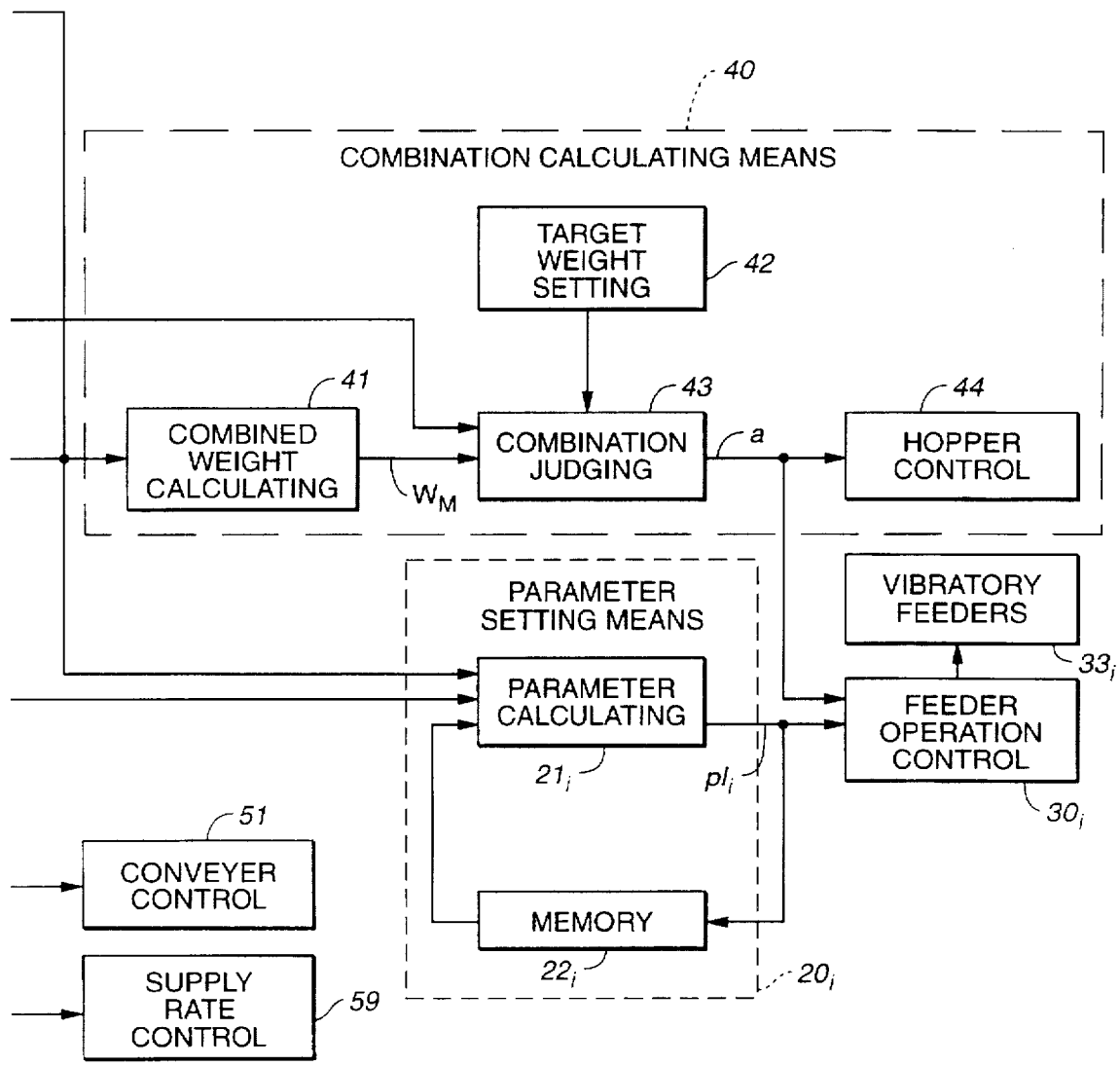
FIG._3B

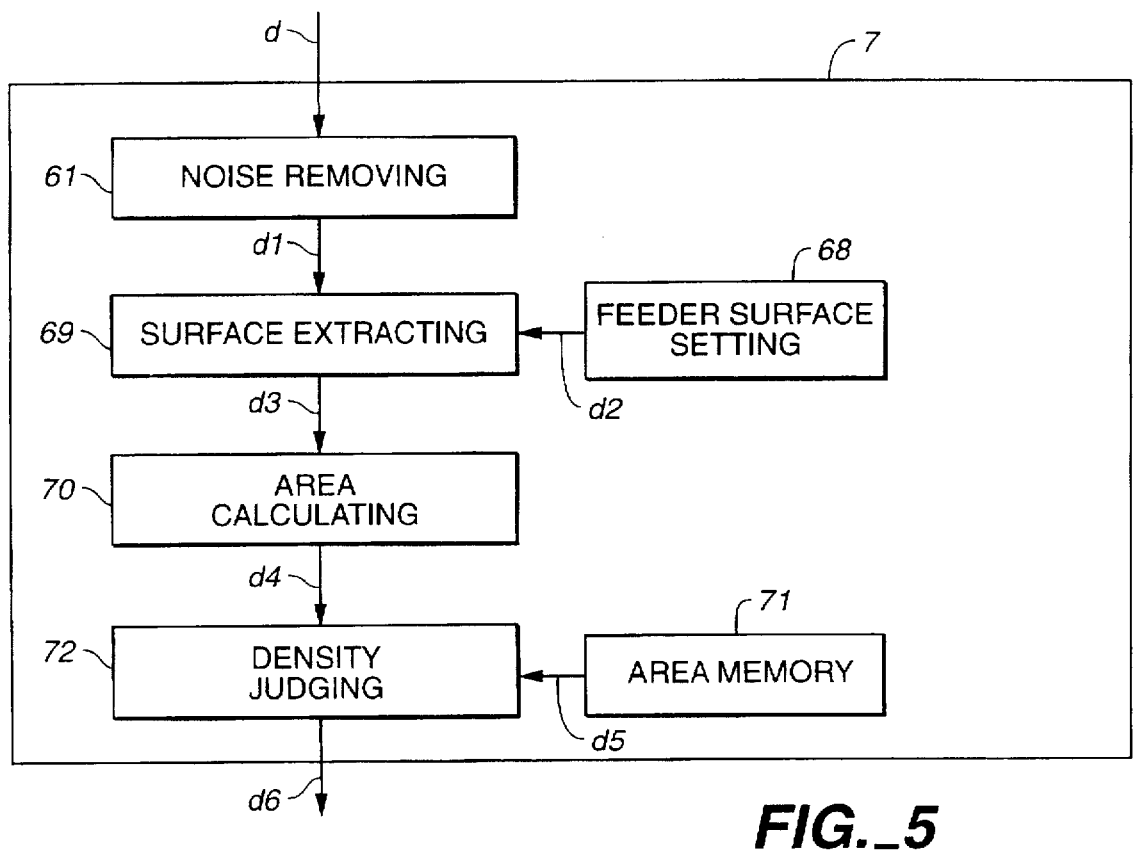
FIG._5
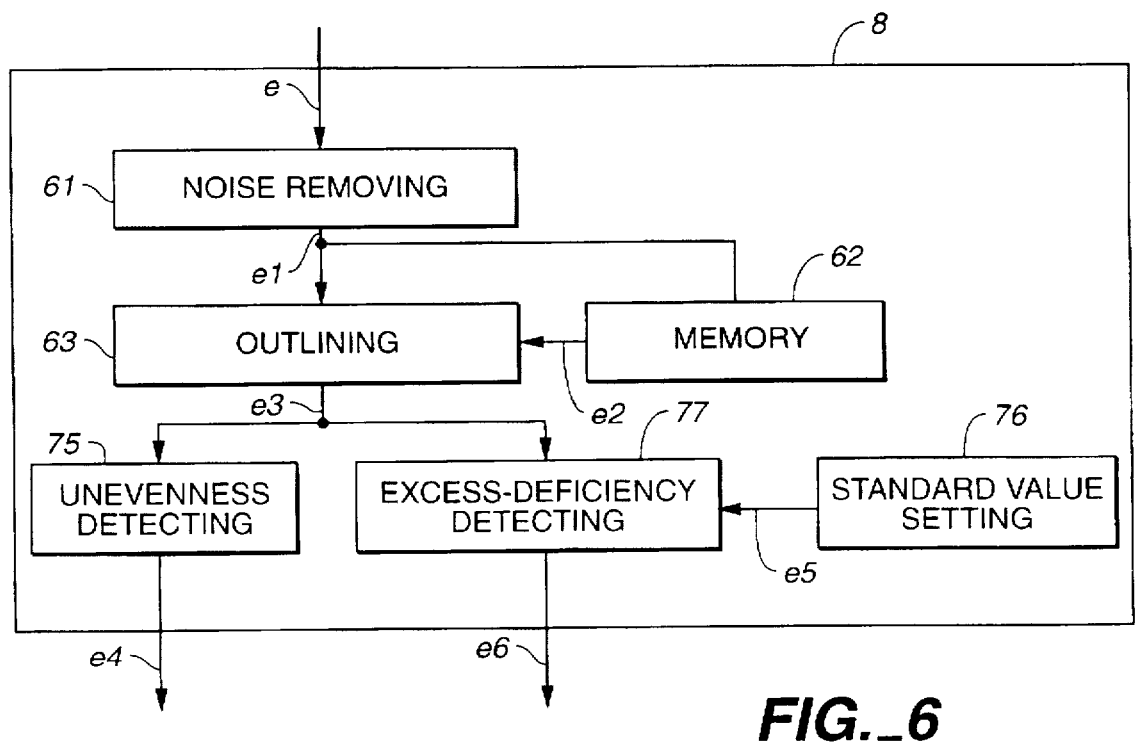
FIG._6

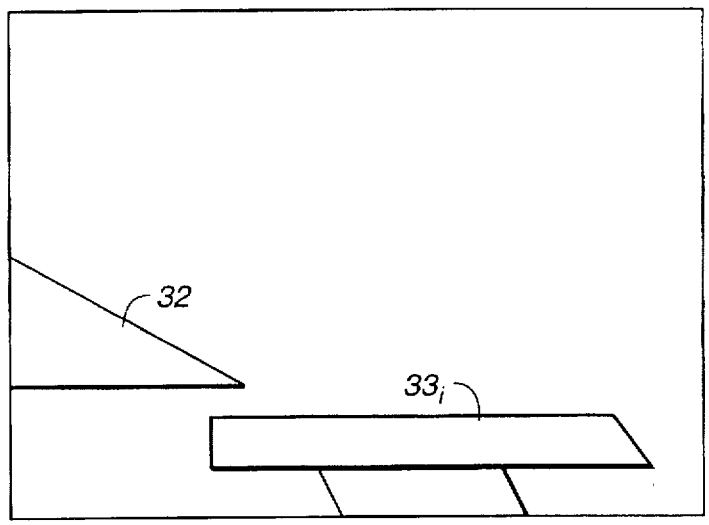
FIG._7
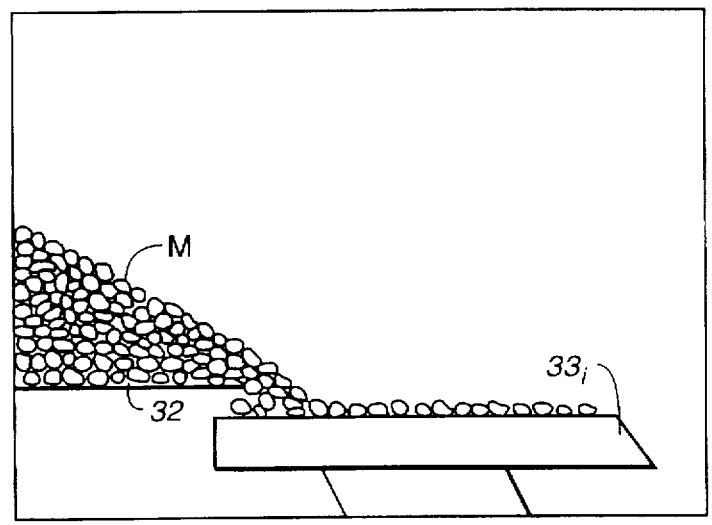
FIG._8
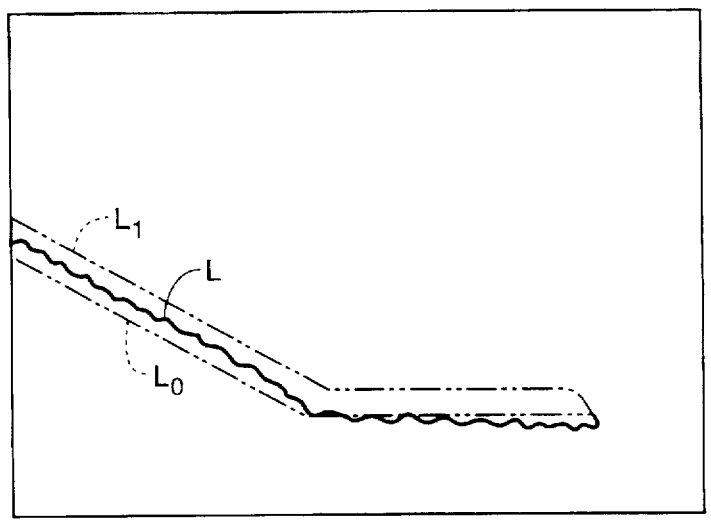
FIG._9

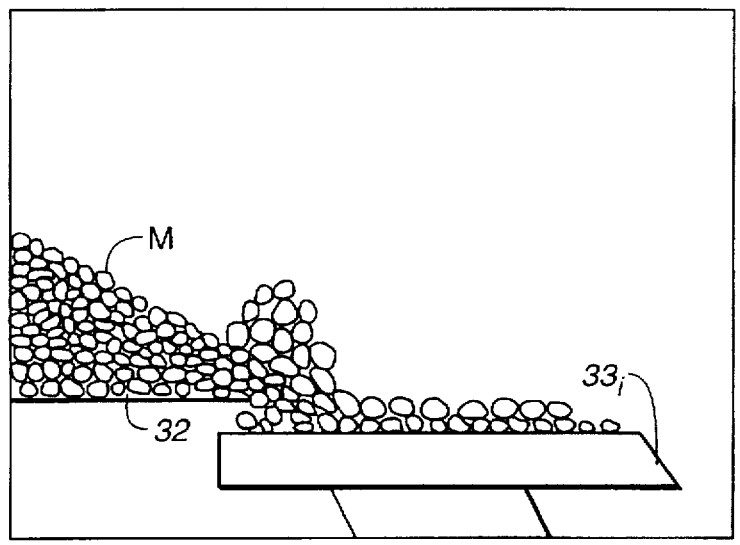
FIG._10
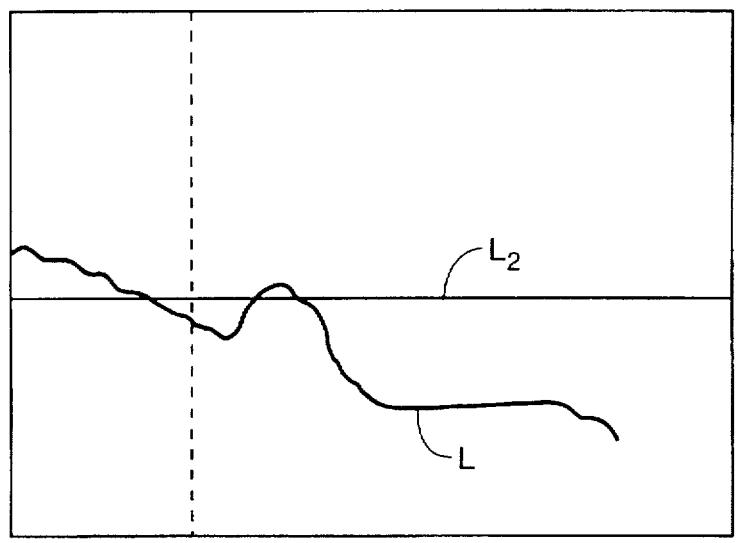
FIG._11
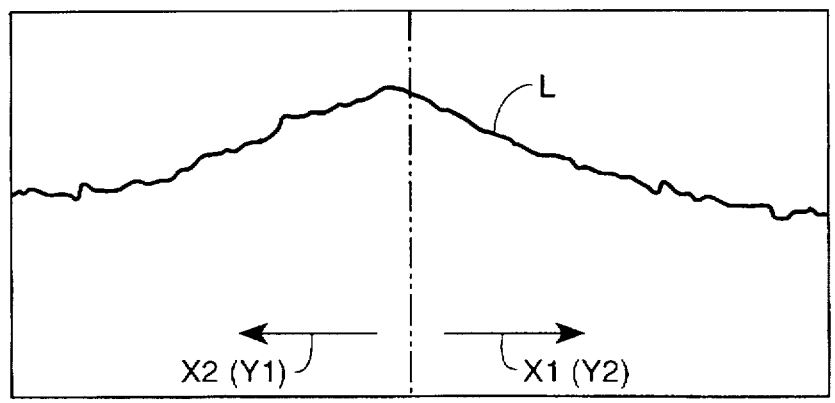
FIG._14

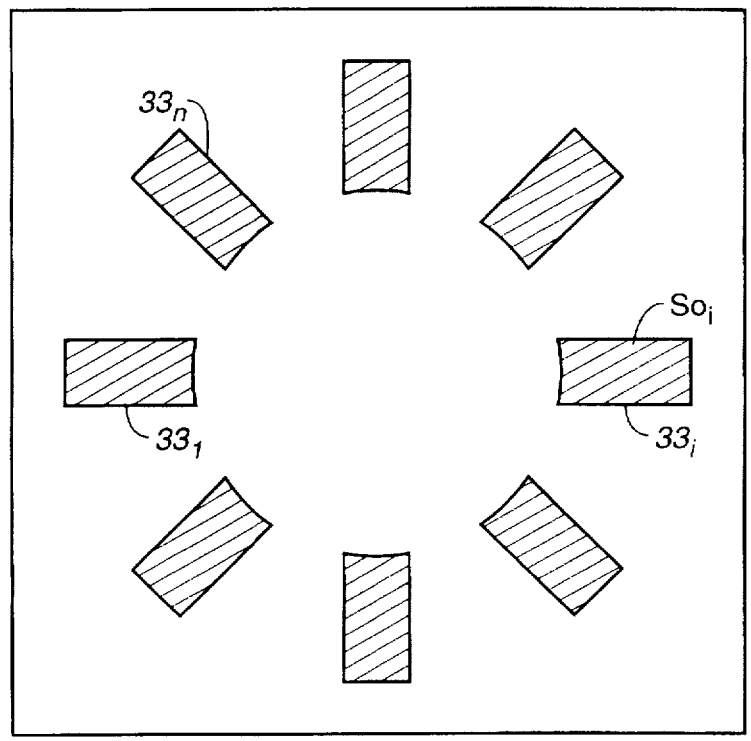
FIG._12
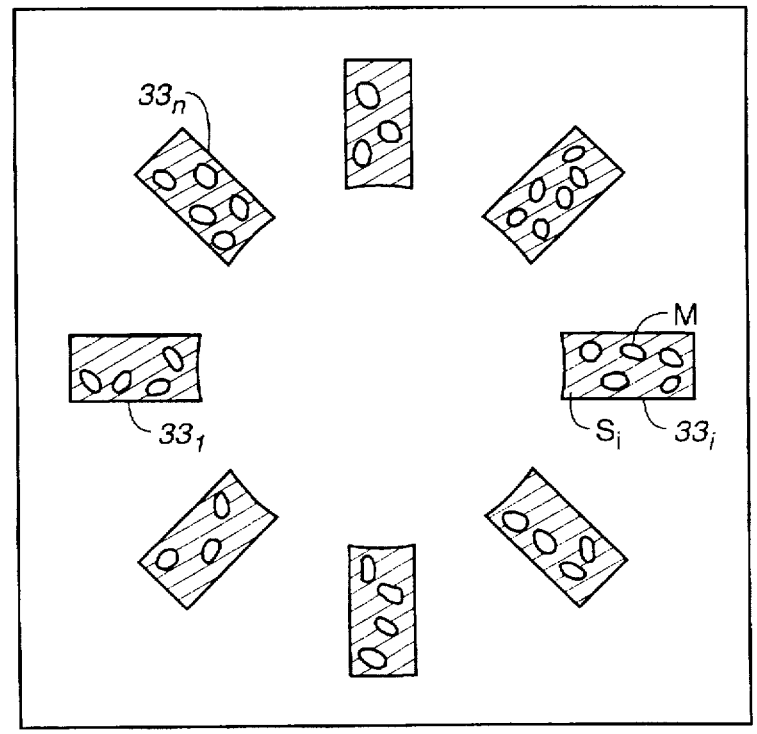
FIG._13

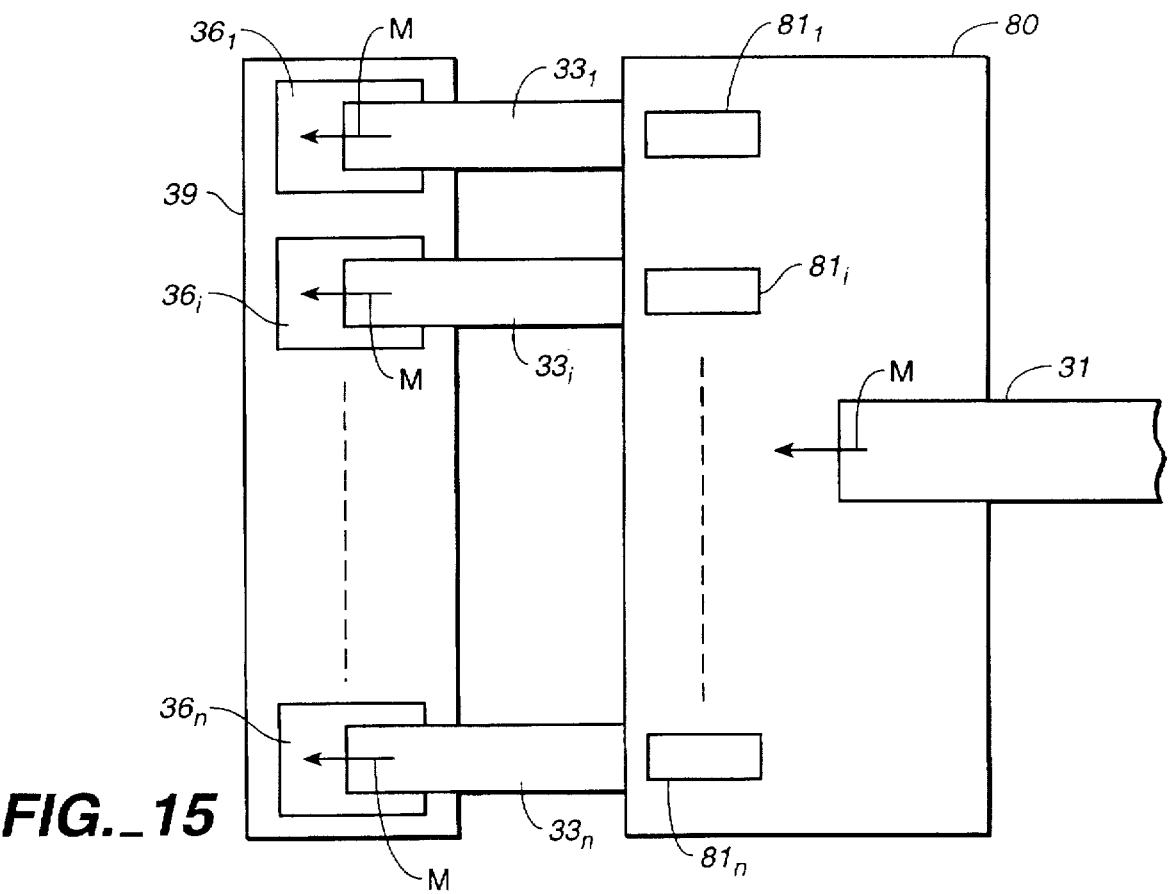
FIG._15
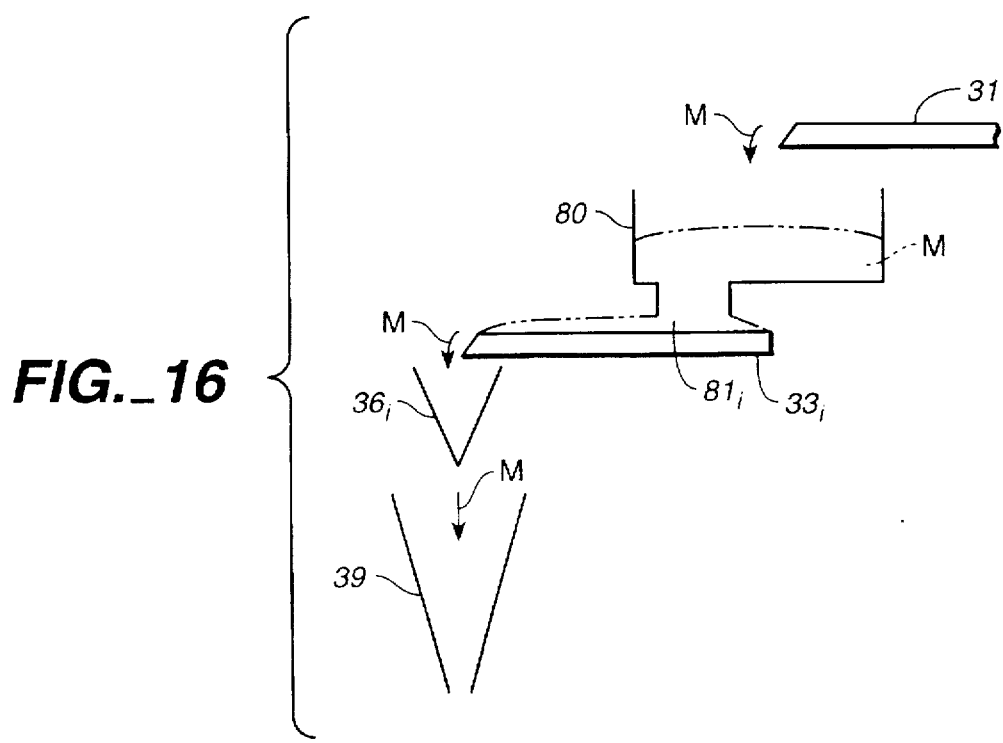
FIG._16

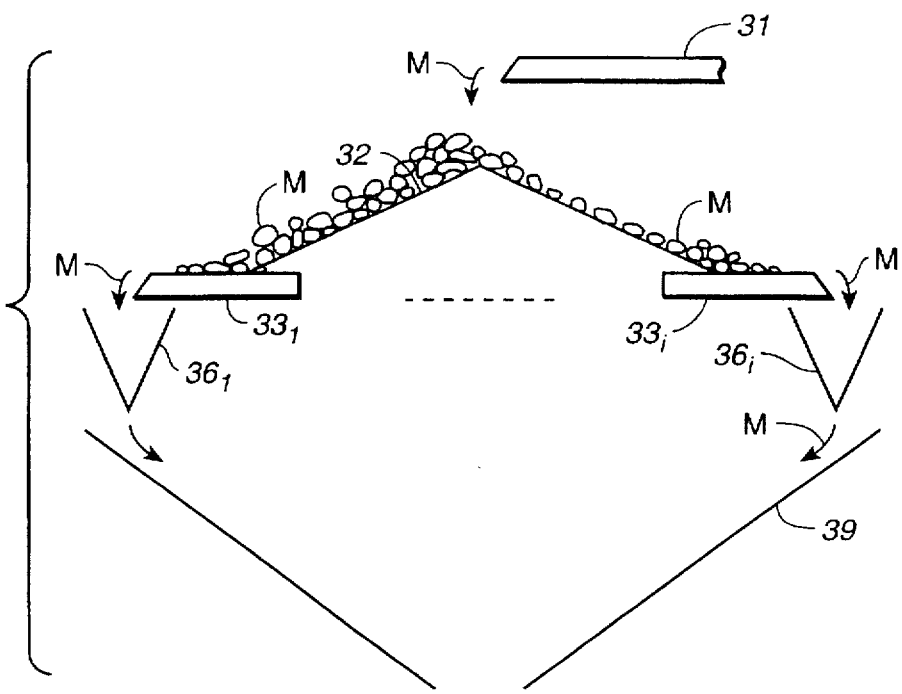
FIG._17
(PRIOR ART)
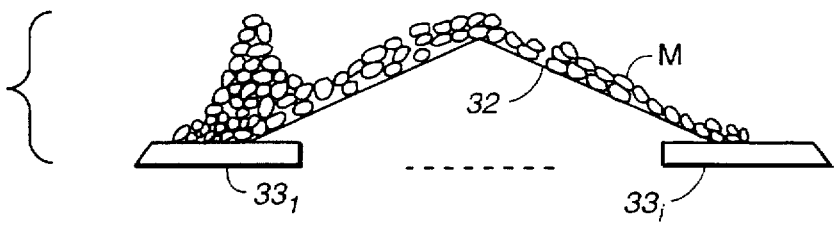
FIG._18
(PRIOR ART)
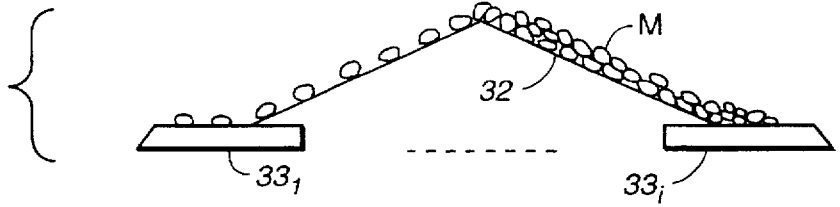
FIG._19
(PRIOR ART)

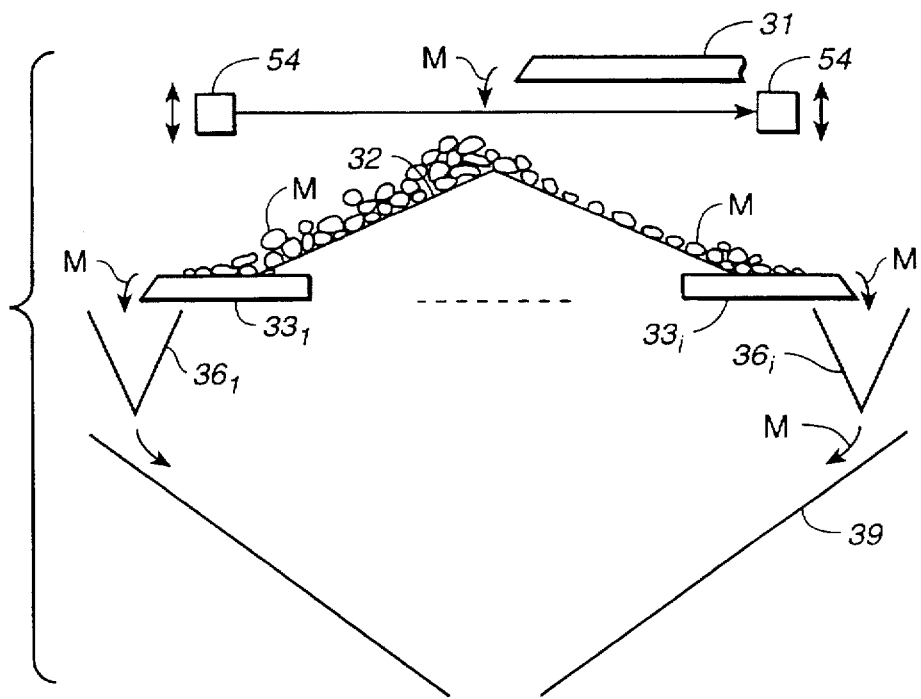
FIG._20
(PRIOR ART)
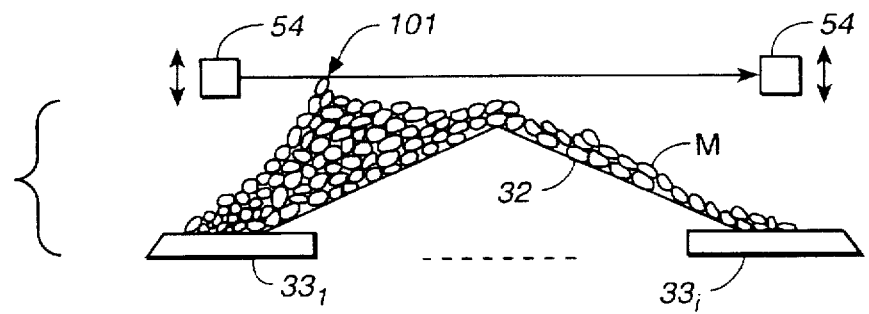
FIG._21
(PRIOR ART)

COMBINATIONAL WEIGHER

BACKGROUND OF THE INVENTION

This invention relates to a combinational weigher which uses a plurality of weighing units to weigh batches of articles such as candies and vegetables and selecting a combination of appropriate article batches on the basis of weight values obtained by these weighing units.

A combinational weigher (as described, for example, in Japanese Patent Publication Tokkai 63-30725) uses a plurality of weighing units to weigh batches of articles such as candies, fruits and vegetables that have individually different weights and selects, on the basis of weight values obtained by these weighing units, a combination of batches having a total weight within an allowable range.

As shown schematically in FIG. 17, articles M to be weighed are transported to the weigher by means of a conveyer belt 31 (serving as an article supplying means), supplied to each of vibratory feeders $33_i$ (serving as transporting means) from a dispersion feeder 32, and delivered from the vibratory feeders $33_i$ to corresponding weigh hoppers $36_i$ (serving as weighing means). Throughout herein, subscript "i" shall serve as a dummy index 1–n; indicating that there are a plurality (=n) of substantially identical objects. A numeral having a subscript "i" shall indicate any one or ones of the corresponding n substantially identical objects. When all these n objects are referred to together, no subscript "i" shall be attached. A combination control system (not shown) combines the measured values (weights of articles) obtained by the weigh hoppers $36_i$ and selects one of the combinations within an allowable range. In other words, a combination having a total weight which is equal to, or the closest to, a given target weight is selected. Articles M from the selected weigh hoppers are discharged together through a discharge chute 39.

In order to carry out the combinational weighing accurately and efficiently, the articles M must be supplied into the individual weigh hoppers $36_i$ at a steady rate such that the amount received by any of them does not become too large or too small but always remains at a specified level (hereinafter referred to as "the target value" obtained by dividing the target weight by the number of hoppers intended to be in each selected combination). For this purpose, new values of parameters for the operation of the individual vibratory feeders $33_i$, such as amplitudes and durations of their vibrations, are set by a parameter-setting means (not shown) adapted to determine new parameter values for the individual vibratory feeders $33_i$ on the basis of their previous parameter values and the amounts of articles actually supplied thereby when they were operated with these parameter values. The vibratory feeders $33_i$ are then operated according to the newly set parameter values such that amounts of the articles M which are close to the target value will be delivered to the weigh hoppers $36_i$.

As shown in FIG. 18, however, there are situations where the flows of the articles M stagnate during the course of their movement from the dispersion feeder 32 to the individual vibratory feeders $33_i$ due to the friction among the articles M, creating a pile. If such a pile grows while stagnating and breaks up suddenly or keeps advancing, an exceedingly large amount of the articles M will be supplied to the weigh hopper $36_i$ corresponding to the vibratory feeder $33_i$, presenting an "over-scale" condition. Weigh hoppers $36_i$ in an over-scale condition are not likely to be selected and adversely affect the efficiency of the combinational calculation.

Another problem is that the bulk of the articles M piled up on the dispersion feeder 32 ("piled bulk") is not always evenly distributed circumferentially, as illustrated in FIG. 19 which also shows that some of the vibratory feeders $33_i$ thereby receive more articles than the others.

Consider a vibratory feeder $33_i$ transporting an exceeding small amount of the articles M thereon. Although it has received a smaller-than-normal amount of the articles M from the dispersion feeder 32, it is operated according to the parameter values set earlier therefor until it is adjudged that the amount of the articles M received by the corresponding weigh hopper $36_i$ is smaller than the target value. If this condition of deficiency is discovered, the parameter values are updated in order to increase the amount of the articles M received by this weigh hopper $36_i$ such that it will begin to receive the target value of the articles M, but the vibratory feeder $33_i$ will be operated until then with the old set parameter values set earlier. Accordingly, if the corresponding weigh hopper $36_i$ is selected in a combination and discharges its contents several times, it will start receiving only extremely small amounts of the articles M thereafter, and such a weigh hopper $36_i$ will not be able to participate in the combinational calculation. This also affects the efficiency of the combinational weighing adversely.

In order to deliver approximately the specified amount of the articles M to each of the weigh hoppers $36_i$ all the time, the piled bulk of the articles M itself must be maintained at a specified level according to the parameter values for the vibration of the dispersion feeder 32. For this purpose, Japanese Utility Model Publication Jikkai 5-51820 disclosed a device, as shown in FIG. 20, adapted to vary the supply rate of the articles M from the conveyer belt 31 to the dispersion feeder 32, depending on the piled bulk of the articles M. A vertically mobile photoelectric sensor 54 is used to detect the height of the piled bulk, and the supply rate is increased if the pile of the articles M is detected to be lower than the position of the sensor 54, the supply rate being decreased if the pile is higher than the sensor 54.

If the shape of the pile is very irregular, as shown in FIG. 21, however, the amount of the articles M in the piled bulk may be misjudged by the detector because the photoelectric sensor 54 is adapted to detect the highest part of the pile (indicated by numeral 101 in FIG. 21). In other words, there may actually not be the desired amount of the articles M on the dispersion feeder 32, and this additionally would cause the occurrence of weigh hoppers which cannot be selected in a combination, adversely affecting the efficiency of the combinational weighing.

It is therefore another object of this invention to eliminate such problems by providing an improved combinational weighing machine.

SUMMARY OF THE INVENTION

A combinational weigher according to a first embodiment of this invention comprises a plurality of supplying means for supplying articles, a plurality of measuring means for receiving articles individually from the supplying means and measuring (that is, either weighing or determining the number of) the received articles, a combination calculating means for combining measured values obtained individually by the measuring means and selecting a combination of articles having a total measurement (that is, either the total weight or the total number of the articles) within an allowable range, means for collecting and discharging the selected articles, camera means for taking in images (at least of the supplying means or the articles thereon), image processing means for obtaining from these images information on conditions of article movements on the supplying means, a predicting means for making predictions on changes in the supply rates of articles from the supplying means at least on the basis of the conditions of article movements thus obtained, and parameter control means for changing operating conditions of the supplying means to thereby control changes in the supply rates of articles from the supplying means on the basis of such predictions.

With a combinational weigher thus structured, changes in the supply rates from the individual supplying means can be predicted on the basis of the conditions of article movements on the supplying means and the operating conditions of the supplying means are changed so as to control such changes. Thus, occurrence of abnormal transportation conditions can be controlled, occurrence of weighing means which cannot be used in combinations can be prevented, and the efficiency of combinational weighing can be improved.

A combinational weigher according to another embodiment of the invention comprises camera means for taking in images, image processing means for obtaining from such images information on conditions of article movements on supplying means, a predicting means for making predictions on changes in the supply rates of articles from the supplying means at least on the basis of the obtained conditions of article movements, and combination control means for changing the amount of articles discharged per unit time from selected combinations of the measuring means on the basis of these predictions such that changes in supply rate of articles from the supplying means are controlled.

With a combinational weigher thus structured, changes in the supply rates from the individual supplying means can be predicted on the basis of the conditions of article movements on the supplying means, and the amount of articles discharged per unit time from selected combinations of the measuring means is changed. Thus, occurrence of abnormal conditions of article movements can be controlled, occurrence of weighing means which cannot be used in combinations can be prevented, and the efficiency of combinational weighing can be improved.

A combinational weigher according to still another embodiment of the invention comprises camera means for taking in images, image processing means for detecting abnormal conditions in article movement on supplying means on the basis of image signals from the camera means, and parameter control means for changing operating conditions of the supplying means on which the abnormal condition was detected such that the abnormal condition is eliminated.

With a combinational weigher thus structured, occurrence of weighing means which cannot be used in combinations can be prevented and the efficiency of combinational weighing can be improved because abnormal conditions in the article movements on the supplying means can be detected and the operating conditions of the corresponding supplying means are changed such that the abnormal condition can be eliminated.

A combinational weigher according to still another embodiment of the invention comprises camera means for taking in images, image processing means for detecting abnormal conditions in article movement on supplying means from image signals from the camera means, and combination control means for changing the amount of articles discharged per unit time from selected combinations of measuring means such that the abnormal conditions are eliminated.

With a combinational weigher thus structured, occurrence of weighing means which cannot be used in combinations can be prevented and the efficiency of combinational weighing can be improved because abnormal conditions in the article movements on the supplying means can be detected and the amount of articles discharged per unit time from selected combinations of the measuring means is changed such that the abnormal condition can be eliminated.

A combinational weigher according to still another embodiment of this invention comprises camera means for taking in images, image processing means for detecting densities of articles on supplying means on the basis of image signals from the camera means, and combination control means for changing operating conditions of the supplying means on the basis of the detected densities.

With a combinational weigher thus structured, occurrence of weighing means which cannot be used in combinations can be prevented and the efficiency of combinational weighing can be improved because the densities of articles on the supplying means can be detected and the operating conditions of the supplying means are changed according to the detected densities.

A combinational weigher according to still another embodiment of this invention comprises camera means for taking in images, image processing means for detecting densities of articles on supplying means on the basis of image signals from the camera means, and combination control means for changing the amount of articles discharged per unit time from selected combinations of measuring means corresponding to the supplying means on the basis of the detected densities.

With a combinational weigher thus structured, occurrence of weighing means which cannot be used in combinations can be prevented and the efficiency of combinational weighing can be improved because the densities of articles on the supplying means can be detected and the amount of articles discharged per unit time from selected combinations of the measuring means is changed according to the detected densities.

A combinational weigher according to still another embodiment of the invention comprises a dispersion feeder for having articles dropped thereonto from a supplying means and dispersing the dropped articles radially around, a plurality of measuring means disposed in a circle for measuring these articles received thereby, a plurality of vibratory feeders disposed radially corresponding to the measuring means for delivering the articles from the dispersion feeder individually to the measuring means, a combination calculating means for combining measured values obtained individually by the measuring means and selecting a combination of articles having a total measurement within an allowable range, camera means for taking in images of at least either the dispersion feeder or the articles on the dispersion feeder, image processing means for receiving the images from the image receiving means and thereby obtaining information on unevenness of the articles on the dispersion feeder, and dropping point control means for adjusting, on the basis of the obtained information on unevenness, the dropping position at which the articles are dropped on the dispersion feeder.

With a combinational weigher thus structured, unevenness in the distribution of the articles can be reduced on the dispersion feeder and the amounts of the articles carried to the measuring means become nearly equal. This prevents the occurrence of measuring means which cannot participate in the selected combination and the efficiency of combinational calculation is improved.

A combinational weigher according to still another embodiment of the invention comprises a dispersion feeder for having articles dropped thereonto from a supplying means and dispersing the dropped articles radially around, a plurality of measuring means disposed in a circle for measuring the articles received thereby, a plurality of vibratory feeders disposed radially corresponding to the measuring means for delivering the articles from the dispersion feeder individually to the measuring means, a combination calculating means for combining measured values obtained individually by the measuring means and selecting a combination of articles having a total measurement within an allowable range, image receiving means for taking in images of at least either the dispersion feeder or the articles on the dispersion feeder, image processing means for receiving image signals from the image receiving means and thereby determining sufficiency or insufficiency (or excess or deficiency) of the articles on the dispersion feeder, and supply control means for controlling the rate of supply of said articles onto the dispersion feeder on the basis of the sufficiency or insufficiency determined by the image processing means.

With a combinational weigher thus structured, sufficiency or insufficiency of the articles on the dispersion feeder can be accurately determined and the amount of the articles on the dispersion feeder can be maintained at a correct level. Thus, the occurrence of measuring means which cannot participate in the selected combination can be reduced, and the efficiency of combinational calculation is improved.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a conceptual side view schematically showing a combinational weigher according to a first embodiment of this invention;

FIG. 2 is a schematic conceptual plan view of the combinational weigher of FIG. 1;

FIG. 3 is a schematic structural diagram of a portion of the combinational weigher of FIG. 1;

FIG. 4 is a schematic structural diagram of the first image processing means of FIG. 3;

FIG. 5 is a schematic structural diagram of the second image processing means of FIG. 3;

FIG. 6 is a schematic structural diagram of the third image processing means of FIG. 3;

FIGS. 7 through 11 are diagrams for explaining the processes carried out by the first image processing means of FIG. 4;

FIGS. 12 and 13 are diagrams for explaining the processes carried out by the second image processing means of FIG. 5;

FIG. 14 is a diagram for explaining the processes carried out by the third image processing means of FIG. 6;

FIG. 15 is a schematic plan view of a combinational weigher of a linear type embodying the present invention;

FIG. 16 is a schematic side view of the weigher of FIG. 15;

FIG. 17 is a schematic side view of a prior art combinational weigher;

FIGS. 18 and 19 are schematic side views of the weigher of FIG. 17, showing two situations where articles are accumulated unevenly on a dispersion feeder;

FIG. 20 is a schematic side view of another prior art combinational weigher; and FIG. 21 is a schematic side view of the weigher of FIG. 20 where articles are accumulated in an abnormal manner.

Throughout herein, components which are substantially equivalent or function similarly are sometimes indicated by the same numerals even if they are parts of different components.

DETAILED DESCRIPTION OF THE INVENTION

In what follows, the invention is described by way of examples with reference to the drawings.

As shown in FIG. 1, which is a schematic side view of a combinational weigher according to this invention, articles M to be weighed are initially put on a first conveyer belt 31A and then dropped therefrom onto a second conveyer belt (or "the article supplying device") 31B which serves to drop the articles M onto a nearly flat conical dispersion feeder 32 approximately at its center. As shown in FIG. 2, the second conveyer belt 31B is movable within a certain limit in the direction of its transportation indicated by arrow X and is also rotatable as shown by arrow Y around a vertical axis. Thus, the landing position of the articles M dropped from the second conveyer belt 31B onto the dispersion feeder 32 can be adjusted by activating motors (not shown) for its motion in the X and Y directions.

The dispersion feeder 32 is for the purpose of receiving the articles M dropped from the second conveyer belt 31B and to disperse the received articles M towards its periphery, around which there are disposed a plurality (=n) of vibratory feeders 33 such that the articles M on the dispersion feeder 32 will not drop into anywhere other than the vibratory feeders 33. (In FIG. 1, subscripts "g" are dummy indices 1<g<i for the purpose of illustrating a circular positioning of n similarly structured components such as vibratory feeders.) Each vibratory feeder $33_i$ is adapted to vibrate according to parameter values set therefor (that is, with the amplitude and for the duration specified therefor) and to thereby deliver the articles M received from the dispersion feeder 32 into corresponding one of n pool hoppers $34_i$.

Each pool hopper $34_i$ is provided with a gate $35_i$, having a weigh hopper $36_i$ disposed correspondingly therebelow. Weighing devices $37_i$ and gates $38_i$ are individually provided to the n weigh hoppers $36_i$. Below the weigh hopper gates 38 is a large collector-discharge chute 39. Below the chute 39 is a packaging machine 1 for collecting the articles M from a selected combination of the weigh hoppers $36_i$ and packaging them in a bag.

The dispersion feeder 32, the vibratory feeders 33, pool hoppers 34, weigh hoppers 36, gates 35 and 38 and collector-discharge chute 39 are all made of a stainless steel material.

As shown in FIG. 2, television cameras $5A_i$ (serving as image receiving means) are set each at a side of one of the vibratory feeders $33_i$. Each camera $5A_i$ is adapted to take the picture of (or take in the image of) the corresponding vibratory feeder $33_i$ and a portion of the dispersion feeder 32 and to output an image signal (indicated by letter "c" in FIG. 3) to a first image processing means 6.

As shown in FIG. 4, the first image processing means 6 includes a noise-removing means 61, to be described below, for receiving image signals c from the cameras $5A_i$ and removing unwanted noise therefrom. In the recording mode of operation, the noise-removing means 61 serves to record in a device-shape memory 62 the image (with the noise removed), as shown in FIG. 7, showing the shape of each vibratory feeder $33_i$ and a portion of the dispersion feeder 32. In the combinational weighing mode of operation, the noise-removing means 61 outputs to an outlining means 63, as shown in FIG. 4, shape signals $c_1$ representing the shapes of the articles M piled on the vibratory feeders $33_i$ and portions of the dispersion feeder 32, as shown in FIGS. 8 and 10.

The outlining means 63 is adapted to receive both the shape signals $c_1$ from the noise-removing means 61 and stored shape signals $c_2$ from the device-shape memory 62, to obtain the difference therebetween, thereby obtaining an outline L, as shown in FIGS. 9 and 11, indicating the manner in which the articles M are piled, and to output outline signals $c_3$ to a supply status detecting means 64 and a pile detecting means 65.

When the supply status detecting means 64 receives outline signals $c_3$ and if the height of the outline L for any vibratory feeder $33_i$ is less than a specified value $L_0$ as shown in FIG. 9, it is concluded that the amount being transported thereby is too small, and a status signal $c_4$ to that effect is outputted to a predicting means 9, as shown in FIG. 3.

When the predicting means 9 receives status signals $c_4$ and weight signals $w_i$ indicative of the weights of the articles M inside the weigh hoppers $36_i$ corresponding to all vibratory feeders $33_i$, if the amount of the articles M being transported is unusually large or the weight value is larger than the target value for any of the vibratory feeders $33_i$, it is concluded that the amount of the articles M being transported by this vibratory feeder $33_i$ is increasing. If the amount being transported is too small or the weighed value is smaller than the target value, on the other hand, it is concluded that the supply rate of the articles M is decreasing. A prediction signal b, indicative of such a conclusion, is outputted to a parameter control means 10 if a specified length of time has not elapsed or a specified number of cycles of operations have not been carried out since the prediction has been started, or to a combination control means 11 if the specified length of time has elapsed or the specified number of cycles of operation have been carried out.

The pile detecting means 65, shown in FIG. 4, is adapted to receive outline signals $c_3$ and, if the height of the outline L of any vibratory feeder $33_i$ is greater than another specified value $L_2$ as shown in FIG. 11, concludes that a pile has been formed on this vibratory feeder $33_i$. Since the part of the graph in FIG. 11 on the left-hand side of the vertical dotted line indicates the central portion of the dispersion feeder 32 where the outline L is expected to be normally high, this portion of the graph is ignored in reaching the aforementioned conclusion. A pile signal $c_5$, indicating for each vibratory feeder $33_i$ whether or not a pile has been formed thereon and, if there is one, the outline of the pile, is outputted from the pile detecting means 65 to both a pile memory 66 and a change detecting means 67.

The pile memory 66 serves to receive and store pile signals $c_5$ and, if a new pile signal $c_5$ is received with a next image signal c, to output to the detecting means 67 (as a stored pile signal $c_6$) the pile signal $c_5$ which has been stored therein.

The change detecting means 67 is adapted to receive a pile signal $c_5$ and a stored pile signal $c_6$ and to compare the conditions of pile on the corresponding vibratory feeder $33_i$. If a pile is detected in both signals, the outlines L are compared and, if there is no horizontal movement of the pile, it is concluded that it is a situation of stagnation. If there is a movement in the horizontal direction, it is concluded that the pile is moving. If the pile has disappeared, it is concluded that the pile is gone. Such conclusions are outputted as a change signal $c_7$ to the parameter control means 10 and the combination control means 11 shown in FIG. 3.

There is another television camera 5B disposed above the center of the dispersion feeder 32, as shown in FIG. 1. As shown also in FIG. 2, this camera 5B serves to take the picture of all of the vibratory feeders 33 from above and to output an image signal d to a second image processing means 7, as shown in FIG. 3.

The second image processing means 7 includes a noise removing means 61, as shown in FIG. 5, for removing unwanted noise from the image signal d and outputting a shape signal $d_1$ to a surface extracting means 69.

The surface extracting means 69 is adapted to receive the shape signal $d_1$ and a set surface signal $d_2$ indicative of the positions and shapes of the vibratory feeders $33_i$ as seen from above (as shown in FIG. 12) and preliminarily inputted manually into a feeder surface setting means 68. An appropriate thresholding process is carried out on the shape signal $d_1$ within the plane of the vibratory feeders $33_i$, and the positions and the shapes of their exposed surface portions not carrying any of the articles M thereon (shaded areas in FIG. 13) are extracted. This extracted information is outputted to an area calculating means 70 through an exposed surface signal $d_3$.

Examples of the aforementioned thresholding process include making use of the fact that the exposed portions of the stainless surface of the vibration feeders $33_i$ are brighter than the articles M and detecting the exposed areas by applying a specified reference brightness level on the set surface signal $d_2$.

The area calculating means 70 is adapted to receive the exposed surface signal $d_3$, to calculate the areas $S_i$ of the exposed portions of the vibratory feeders $33_i$ not covered by the articles M (the areas of the shaded parts shown in FIG. 13), and to output it as an area signal $d_4$ to a density judging means 72.

Both the area signal $d_4$ and a set area signal $d_5$, indicative of a set value $S_{0i}$ of the area of the vibratory feeders $33_i$ seen from above (the shaded area shown in FIG. 12) preliminarily inputted through an area memory 71, are received by the density judging means 72. If the ratio of the area $S_i$ (shown in FIG. 13) of the exposed portion of an vibratory feeder $33_i$ to the area $S_{0i}$ (shown in FIG. 12) set by the area memory 71 exceeds a predetermined level, the density judging means 72 concludes that the density of the articles M on that vibratory feeder $33_i$ is too low and outputs a low density signal $d_6$ to the parameter control means 10, if a specified length of time has not elapsed or a specified number of combinational weighing has not been carried out since the low density judgment was made, and to the combination control means 11 if the specified length of time has elapsed or the specified number of combinational weighing has been carried out.

The parameter control means 10 is adapted to output parameter control signals f to parameter setting means $20_i$ on the basis of the prediction signal b which has been received such that changes in the supply rates of the articles M by the vibratory feeders $33_i$ can be controlled. For those of the vibratory feeders $33_i$ of which the rate of article supply is predicted to increase, their parameter setting means $20_i$ reduce their parameter values (for the amplitude and duration of vibrations) by one unit on the basis of the parameter control signal f. For those of the vibratory feeders $33_i$ of which the rate of article supply is predicted to decrease, their parameter setting means $20_i$ increase their parameter values by one unit. This operation is repeated, like the weighing operations performed in cycles, at the rate of, for example, several tens of times per minute.

On the basis of the change signals $c_7$, that is, on the basis of the information related to stagnation, movement and disappearance of piles on the individual vibratory feeders $33_i$, the parameter control means 10 outputs parameter control signals f to the parameter control means $20_i$ in order to prevent delivery of too large a quantity of the articles M to any particular weigh hopper $36_i$. On the basis of such parameter control signals f, the parameter control means $20_i$ attempt to break up stagnation of piles by maximizing the parameters for the amplitudes of vibration of the corresponding vibratory feeders $33_i$, to control the rates of delivery by reducing the amplitude and time duration parameters for those vibratory feeders $33_i$ on which piles are advancing, and to reset the parameter values to their normal levels (the values before piles were formed) for those of the vibratory feeders $33_i$ from which piles have disappeared. This operation, too, is repeated at a rate of tens of times per minute but, when a pile is stagnating, the control may be continued until the stagnating piles disappear.

On the basis of a low density signal $d_6$, that is, on the basis of information that the density of the articles M on any vibratory feeder $33_i$ is low, the parameter control means 10 outputs a parameter control signal f for reducing the discharge rate per unit time of the corresponding weigh hopper $36_i$. When such a parameter control signal f is received, the corresponding parameter setting means $20_i$ reduces the target value for the corresponding vibratory feeder $33_i$ on which the article density is low. For those vibratory feeders $33_i$ not outputting any low density signal $d_6$, the parameter control means 10 resets the target values to their normal level. These controls, too, are effected at the rate of, say, several tens of times per minute, like the weighing cycle.

The combination control means 11 is adapted to output combination control signals g to a combination calculating means 40 on the basis of the prediction signals b from the predicting means 9 for controlling the changes in the amount of the articles M transported by the vibratory feeders $33_i$. On the basis of such combination control signals g, the combination calculating means 40 operates such that the weigh hoppers $36_i$ corresponding to those vibratory hoppers $33_i$ of which the rates of supply are predicted to increase will be selected in a combination with a higher priority and that the weigh hoppers $36_i$ corresponding to those vibratory hoppers $33_i$ of which the rates of supply are predicted to decrease will be selected in a combination with a reduced probability. For the weigh hoppers $36_i$ corresponding to the vibratory feeders $33_i$ not outputting a prediction signal b, the combination control means 11 operates to remove the setting of the aforementioned selection condition. This control, too, is carried out at the rate of several tens of times per minute.

On the basis of the change signals $c_7$, that is, on the basis of the information related to stagnation, movement and disappearance of piles on any of the vibratory feeders $33_i$, the combination control means 11 outputs a combination control signal g to the combination calculating means 40 in order to prevent a delivery of too large a quantity of the articles M to the corresponding weigh hopper $36_i$. On the basis of such a combination control signal g, the combination calculating means 40 attempts to prevent the weigh hopper $36_i$, corresponding to vibratory feeders $33_i$ on which a pile is advancing, from being selected in a combination, and to cause its neighboring weigh hoppers $36_i$ to be selected with higher priority such that the pile is dispersed to the neighboring hoppers.

For the weigh hopper $36_i$ corresponding to a vibratory feeder $33_i$ from which a pile has disappeared, as well as the weigh hoppers $36_{i+1}$ and $36_{i-1}$ next to it, the combination calculating means 40 releases such priority-altering conditions in response to the combination control signal g. This operation, too, is repeated at a rate of several tens of times per minute.

On the basis of a low density signal $d_6$, that is, on the basis of information that the density of the articles M on any of the vibratory feeders $33_i$ is low, furthermore, the combination control means 11 outputs a combination control signal g for reducing the discharge rate per unit time of the corresponding weigh hopper $36_i$. When such a combination control signal g is received, the combination calculating means 40 attempts to stop the low density condition by making it less likely to have the corresponding weigh hopper $36_i$ selected in a combination. For those weigh hoppers $36_i$ corresponding to vibratory feeders $33_i$ not outputting a low density signal $d_6$, the combination calculating means 40 ceases its attempt to prevent them from being selected in a combination. These controls, too, are effected at the rate of, say, several tens of times per minute, like the weighing cycle.

The weighing devices $37_i$ may comprise load cells and are adapted to measure the weights of the articles M inside the weigh hoppers $36_i$ and output weight signals $w_i$ indicative of the weight values measured thereby to the combination calculating means 40 and also to the parameter setting means $20_i$. The combination calculating means 40 is adapted to combine n weight values of the articles M obtained by the weighing hoppers 36 for selecting, as described below, a particular combination of the weigh hoppers $36_i$ (or articles M) within an allowable range.

The combination calculating means 40 is provided with combined weight calculating means 41, a target weight setting means 42, a combination judging means 43, and a hopper control means 44. The combined weight calculating means 41 is adapted to combine m (<n) of the weight values from the weighing devices 37, to add their weight values, and to output combined weight signals $w_M$ to the combination judging means 43. The combination judging means 43 is adapted to compare the combined weight signals $w_M$ from the combined weight calculating means 41 with a target weight received from the target weight setting means 42, to select a combination with the total weight of the articles M to be packaged falling within a specified allowable range predetermined with respect to the target weight, and to output a selection signal a to the hopper control means 44 as well as to a feeder operation control means $30_i$.

The hopper control means 44 is adapted to open the gates $38_i$ of the selected m weigh hoppers $36_i$ such that the articles M are discharged therefrom, collected by the collector-discharge chute 39 and supplied to the packaging machine 1. The hopper control means 44 is further adapted to open the gates $35_i$ of the pool hoppers $34_i$ corresponding to the discharged weigh hoppers $36_i$ to supply articles M from the pool hoppers $34_i$ to the weigh hoppers $36_i$. The aforementioned feeder operation control means $30_i$ are individually associated with the n vibratory feeders $33_i$ and serve to drive the vibratory feeders $33_i$ corresponding to the emptied pool hoppers $34_i$ according to set parameters and to thereby supply articles M into these pool hoppers $34_i$.

The parameter setting means $20_i$, each comprising a parameter calculating means $21_i$ and a memory $22_i$ as shown in FIG. 3, are for setting new parameter values for the vibratory feeders $33_i$ according to the parameter control signals f. The memories $22_i$ are for storing the parameter values calculated by the parameter calculating means $21_i$ in the preceding cycle and are adapted to receive parameter value signals $p1_i$.

When the inputted parameter control signal f is not based on a low density signal $d_6$, the parameter calculating means $21_i$ increase or decrease the parameter values according to conditions as described above and output them as parameter value signals $p1_i$. If the inputted parameter control signal f is based on a low density signal $d_6$, the parameter calculating means $21_i$ reduces the target value by one unit, determines on the basis of the weight signal $w_i$ from the weighing device $37_i$ whether the delivered amount to the weigh hopper $36_i$ was more or less than the target value, reduces the preceding parameter values from the memory $22_i$ by one unit if the delivered amount was greater than the target value, and outputs the reduced parameter values as parameter value signal $p1_i$. If the delivered amount was less than the target value, on the other hand, the parameter values from the memory $22_i$ are increased by one unit and the increased parameter values are outputted as parameter value signal $p1_i$.

As shown in FIG. 1, there are additionally two television cameras 5C and 5D disposed above and separated from the dispersion feeder 32. Each of these cameras 5C and 5D is adapted to take pictures of the dispersion feeder 32 and portions of the vibratory feeders $33_i$ diagonally from above from two mutually perpendicular directions as shown in FIG. 2 and to output image signals e to a third image processing means 8.

As shown in FIG. 6, the third image processing means 8 includes a noise removing means 61 as described above. Since portions of its structure and their functions for obtaining an outline (as shown in FIG. 14) of the articles M accumulated on the dispersion feeder 32 and its surrounding areas are identical to those of the first image processing means 6, they are not repetitively described here. The outlining means 63 of FIG. 6, however, outputs an outline signal $e_3$ to an unevenness detecting means 75 and an excess-deficiency detecting means 77.

The unevenness detecting means 75 is adapted to receive an outline signal $e_3$, to detect unevenness in the distribution of the articles M by comparing the areas on the left-hand and right-hand sides of the figure under the outline L of FIG. 14, and to output an unevenness signal $e_4$ to a dropping point control means 50 as shown in FIG. 3. Alternatively, the unevenness in the distribution of the articles M may be detected by locating the position of the center of mass of the total area under the outline L of FIG. 14.

The excess-deficiency detecting means 77 of FIG. 6 is adapted to receive an outline signal $e_3$, to calculate the total area of the figure under the outline L shown in FIG. 14, to compare this calculated area with a pre-specified standard area value received from a standard value setting means 76 by a standard value signal $e_5$, and to output a comparison signal $e_6$ to a supply control means 58.

The dropping point control means 50 is adapted to output a displacement signal h to a conveyer control means 51 on the basis of the unevenness signal $e_4$, or according to the deviations in the X and Y directions of the center of mass of the articles M, such that the dropping point of the articles M can be shifted.

The conveyer control means 51 is adapted to rotate the motors (not shown) for the second conveyer 31B shown in FIG. 2 to move it in the X and Y directions by single units in response to the displacement signal h.

The supply control means 58 shown in FIG. 3 is adapted to output a supply rate control signal j to a supply rate control means 59 on the basis of the comparison signal $e_6$, or the excess or deficiency of the articles on the dispersion feeder 32. As a result, the supply rate of articles M onto the second conveyer 31B is increased or decreased such that the supply rate to the dispersion feeder 32 is changed and that the amount of the articles M on the dispersion feeder 32 is maintained at a specified level.

The present invention has been described above with reference to a combinational weigher of the type shown in FIG. 2, having vibratory feeders $33_i$ extended radially and weigh hoppers $36_i$ circularly arranged. This invention is applicable, however, also to combinational weighers of a so-called linear type shown, for example, in FIG. 15 except regarding the parts related to the third image processing means 8. With reference to the plan view shown in FIG. 15, articles M to be weighed are dropped from a conveyer 31 into a supply hopper 80 having n supply holes $81_i$, pass on n vibratory feeders $33_i$ corresponding to these supply holes $81_i$ and are received by n weigh hoppers $36_i$ arranged linearly. As shown in FIG. 16, the weigh hoppers $36_i$ are disposed below the vibratory feeders $33_i$, and a single collector-discharge chute 39 is provided below the weigh hoppers $36_i$, as in the example shown above in FIG. 1.

Next will be described the operations of a weigher according to the embodiment of the invention described above with reference to FIGS. 1 and 2. To start by briefly describing some basic operations of the combinational weigher, articles M to be weighed are supplied from the second conveyer 31B shown in FIG. 1 to the dispersion feeder 32 and then to the packaging machine 1 through the vibratory feeders $33_i$, the pool hoppers $34_i$, the weigh hoppers $36_i$ and the collector-discharge chute 39 to be made into packages. In the meantime, the combination calculating means 40 shown in FIG. 3 serves to select a combination of m weigh hoppers $36_i$ providing a total weight of the articles M within an allowable range. Next, the combination calculating means 40 selects a combination from the remaining weigh hoppers $36_i$ and discharges the articles M therefrom.

The hopper control means 44 opens the gates $35_i$ of the pool hoppers $34_i$ corresponding to the discharged weigh hoppers $36_i$ to supply articles M from the pool hoppers $34_i$ to the emptied weigh hoppers $36_i$. The vibratory feeders $33_i$ corresponding to the discharged pool hoppers $34_i$ are activated and supply articles M to the emptied pool hoppers $34_i$.

Next will be described the operations of this weigher when the supply rate of articles M by a vibratory feeder $33_i$ or a measured weight value by the corresponding weigh hopper $36_i$ has gone outside a normal range. For the sake of simplicity, only a situation where the supply rate or the measured weight value has become excessively small. In such a situation, the predicting means 9 shown in FIG. 3 predicts that the supply rate of articles M from the vibratory feeder $33_i$ will decrease, and a prediction signal b to that effect is outputted to the parameter control means 10 until a specified length of time has elapsed or a specified number of cycles have been carried out since the prediction was started.

The parameter control means 10 outputs a parameter control signal f to the parameter setting means $20_i$ on the basis of the prediction signal b. On the basis of this parameter control signal, the parameter setting means $20_i$ increases the amplitude parameter or time duration parameter by one unit for any vibratory feeder $33_i$ of which the supply rate of articles M is predicted to decrease. The increasing of parameter values is repeated every time articles M are discharged from the corresponding weigh hoppers $36_i$ until the supply rates and the measured weight values come back into the normal ranges such that the supply rates of articles M from the vibratory feeders $33_i$ are prevented from decreasing. If the supply rate or measured weight value has become greater than a normal level, the control is effected in the reverse direction.

In summary, since changes in the supply rates from the vibratory feeders $33_i$ are predicted according to this invention whenever the supply rate of articles M by a vibratory feeder $33_i$ or the measured weight value by the corresponding weigh hopper $36_i$ goes out of the normal range, formation of piles is prevented and the density of articles M on the vibratory feeders $33_i$ is prevented from decreasing to such an extent that the ratio of exposed area exceeds a specified level. In other words, occurrence of weigh hoppers $36_i$ not used in combinational calculations is prevented, and the efficiency of combinational weighing is improved.

Next will be described the operations according to this invention when the changes in the supply rates of articles M by the vibratory feeders $33_i$ cannot be controlled on the basis of predictions by the predicting means 9 described above and piles of articles M are being formed or the density of articles M has become excessively low to the extent that the ratio of exposed area of a vibratory feeder $33_i$ has exceeded a normal level, that is, when the supply condition of the articles M has become abnormal.

A situation where a pile of articles M has been formed will be described first. Let us assume that the pile detector 65 shown in FIG. 4 has detected the existence of a pile of articles M on a vibratory feeder $33_i$ and that the change detecting means 67 has ascertained that the pile is stagnating. In such a situation, a change signal $c_7$ to that effect is transmitted to the parameter control means 10 shown in FIG. 3.

On the basis of this change signal $c_7$, that is, on the information that a pile is stagnating on the vibratory feeder $33_i$, the parameter control means 10 outputs a parameter control signal f to the parameter setting means $20_i$. On the basis of this parameter control signal f, the parameter setting means $20_i$ maximizes the amplitude parameter of this vibratory feeder $33_i$ on which the pile is stagnating such that the pile will break down by the intensified vibrations of this vibratory feeder $33_i$ with the maximum amplitude.

Alternatively, vibrations of this vibratory feeder $33_i$ with the maximum amplitude may be started immediately after the parameter control signal f is outputted from the parameter control means 10 without waiting for the corresponding weigh hopper $36_i$ to be selected in a combination, or even without a selection signal being transmitted from the combination judging means 43 to the vibratory feeder $33_i$.

When the absence of the pile is detected by the pile detecting means 65 and the disappearance of the pile is ascertained by the change detecting means 67, a change signal $c_7$ to this effect is transmitted to the parameter control means 10. On the basis of this change signal $c_7$, or on the basis of the information that the pile has disappeared from the vibratory feeder $33_i$, the parameter control means 10 outputs a parameter control signal f to the parameter setting means $20_i$. On the basis of this parameter control signal f, the parameter setting means $20_i$ resets the parameter values of the vibratory feeder $33_i$, from which the pile has disappeared, to their normal values.

In this manner, the articles M which once formed a pile are supplied to the corresponding weigh hopper $36_i$ at an appropriate rate. This is to be contrasted to the prior art situation wherein a pile which stagnates and is broken up all of a sudden causes articles M to be supplied to the corresponding weigh hopper at once, giving rise to an over-scale condition.

If the pile detecting means 65 detects that a pile has been formed on a vibratory feeder $33_i$ and the change detecting means 67 detects that this pile is moving ahead, a change signal $c_7$ to this effect is transmitted both to the parameter control means 10 and to the combination control means 11.

On the basis of such a change signal $c_7$, or the information that a pile is moving along on the vibratory feeder $33_i$, the parameter control means 10 outputs a parameter control signal f to the parameter setting means $20_i$. On the basis of this parameter control signal f, the parameter setting means $20_i$ reduces to zero the vibration time duration parameter for the vibratory feeder $33_i$ on which the pile is advancing, thereby stopping the supply of articles M from this vibratory feeder $33_i$ to the corresponding weigh hopper $36_i$.

In the meantime, the combination control means 11 outputs a combination control signal g to the combination calculating means 40 on the basis of the change signal $c_7$. On the basis of this combination control signal g, the combination calculating means 40 prevents the corresponding weigh hopper $36_i$ from becoming selected in the combination and serves to have the neighboring weigh hoppers $36_{i-1}$ and $36_{i+1}$ selected in the combination.

As a result, the articles M which formed the pile, unable to advance because the vibratory feeder $33_i$ has stopped, pass through the neighboring vibratory feeders $33_{i-1}$ and $33_{i+1}$ and are discharged from the corresponding weigh hoppers $36_{i-1}$ and $36_{i+1}$. Thus, the pile on the vibratory feeder $33_i$ disappears without causing any over-scale condition. This is to be contrasted with the prior art technology according to which the pile would continue to advance and supply a large amount of articles to a single weigh hopper all of a sudden.

When a pile disappears, the absence of the pile is detected by the pile detecting means 65, and its disappearance is ascertained by the change detecting means 67. A change signal $c_7$ to this effect is transmitted to the parameter control means 10 and the combination control means 11 of FIG. 3. On the basis of this change signal $c_7$, or the information on the disappearance of the pile from the vibratory feeder $33_i$, the parameter control means 10 outputs a parameter control signal f to the parameter setting means $20_i$. On the basis of this parameter control signal f, the parameter setting means $20_i$ resets the parameter values for this vibratory feeder $33_i$ to their normal level, or the values before the pile was formed. In the meantime, the combination control means 11 outputs a combination control signal g to the combination calculating means 40 on the basis of this change signal $c_7$. On the basis of this combination control signal g, the combination calculating means 40 releases the aforementioned restricting conditions on the corresponding weigh hopper $36_i$ and its neighboring weigh hoppers $36_{i-1}$ and $36_{i+1}$, returning to the normal conditions before the pile was formed.

As described above, even if a pile is formed, occurrence of weigh hoppers which will continue to fail to be selected in a combination can be prevented according to this invention, and the efficiency of combinational weighing can thus be improved.

Next will be described the operations according to this invention when there is a vibratory feeder $33_i$ on which the density of articles M has become very low. When the density judging means 72 of FIG. 5 detects that the article density on any vibratory feeder $33_i$ is abnormally low, a low density signal $d_6$ to this effect is transmitted to the parameter control means 10 of FIG. 3 until a specified length of time elapses or a specified number of cycles have been processed since the low density condition was detected.

On the basis of the low density signal $d_6$, or the information that the article density on the vibratory feeder $33_i$ is low, the parameter control means 10 outputs a parameter control signal f to the parameter setting means $20_i$. On the basis of this parameter control signal f, the parameter setting means $20_i$ reduces the target value for this vibratory feeder $33_i$ by one unit.

After the target values are thus reduced and articles M are discharged from the corresponding weigh hopper $36_i$, the aforementioned parameter calculating means $21_i$ determines on the basis of the weight signals $w_i$ from the weighing devices $37_i$, as described above, whether the amount of articles M transported to the weigh hopper $36_i$ is greater or small than the target value and, if greater than the target value, reduces the parameter values in the memories $22_i$ by one unit, outputting these reduced parameter values as parameter value signals $p1_i$. This reduction of parameter values by reducing the target value is repeated every time articles M are discharged from the corresponding weigh hopper $36_i$ until the density of articles M on the vibratory feeder $33_i$ is found to be sufficiently high. In the meantime, the supply rate of articles M into the corresponding weigh hopper $36_i$ remains appropriately low corresponding to the supply rate from the dispersion feeder 32 to this vibratory feeder $33_i$.

In summary, even if the density of the articles M on a vibratory feeder $33_i$ becomes very low, the supply rate to the weigh hopper $36_i$ does not become excessively low. Thus, occurrence of weigh hoppers not selectable in a combination can be prevented, and the efficiency of combinational weighing can thus be improved.

If a low-density condition on a vibratory feeder $33_i$ cannot be eliminated by such a control by the parameter control means 10 for a specified period of time or over a specified number of cycles of operation after the low-density condition was detected by the density judging means 72 of FIG. 5, a low density signal $d_6$ is transmitted to the combination control means 11. On the basis of this low density signal $d_6$, or the information that a low-density condition exists on the vibratory feeder $33_i$, the combination control means 11 outputs a combination control signal g to the combination calculating means 40. On the basis of this combination control signal g, the combination calculating means 40 operates to prevent the weigh hopper $36_i$ corresponding to this vibratory feeder $33_i$ from being selected in a combination.

This restrictive condition is continued until the density judging means 72 concludes that the density of the articles M on this vibratory feeder $33_i$ is sufficiently high. In this manner, the weigh hopper $36_i$ is prevented from receiving only a very small amount of the articles M and not being thereafter selected in a combination. When the density of articles M on the vibratory feeder $33_i$ becomes sufficiently high, the restrictive condition is removed and the corresponding weigh hopper $36_i$ is allowed to participate in the combinational calculations. According to this invention, therefore, even if the density of articles M becomes low on a vibratory feeder $33_i$, occurrence of a weigh hopper which will continue to be non-selectable can be prevented, and the efficiency of combinational weighing can thus be improved.

Next will be described the operations when unevenness occurs in the distribution of the articles M on the dispersion feeder 32. If the unevenness detecting means 75 shown in FIG. 6 detects, from the image signals e from the camera 5D or 5C, that the articles M are unevenly distributed on the dispersion feeder 32 in the direction of X and/or Y shown in FIG. 2, an unevenness signal $e_4$ to this effect is transmitted to the dropping point control means 50 shown in FIG. 3.

On the basis of this unevenness signal $e_4$, or the information on the unevenness of distribution in the X or Y direction, the dropping point control means 50 outputs a displacement signal h to the conveyer control means 51 shown in FIG. 3. On the basis of this displacement signal h, the conveyer control means 51 activates the motors (not shown) for the second conveyer 31B shown in FIG. 2 to move it by a unit in the X and/or Y direction.

Suppose, for example, that the image captured by the camera 5C is as shown in FIG. 14. Since it may be concluded from the outline in FIG. 14 that the articles M are more heavily loaded towards the left, or in the direction of Y1 shown in FIG. 2, the second conveyer 31B is rotated such that its article-discharging end will move by one unit (say, about 2 mm) in the direction of arrow Y2 shown in FIG. 2, correcting somewhat the position where the articles M will land on the dispersion feeder 32. In other words, the dropping point is moved in units in the direction opposite to where the articles M are heavily loaded.

The unevenness of the articles M on the dispersion feeder 32 can thus be corrected, and the articles M are distributed evenly to the weigh hoppers $36_i$. In this manner, the occurrence of weigh hoppers $36_i$ not usable in combinational weighing can be prevented.

Next will be explained the operations when the supply rate to the dispersion feeder 32 has become abnormally large or small. When an excess or deficiency condition in the amount of articles M on the dispersion 32 is detected by the excess-deficiency detecting means 77 shown in FIG. 6, a comparison signal $e_6$ to this effect is transmitted to the supply control means 58 shown in FIG. 3.

On the basis of this comparison signal $e_6$, or the information that an excess or deficiency condition exists on the dispersion feeder 32, the supply control means 58 outputs a supply rate control signal j to the supply rate control means 59, thereby increasing or reducing the supply rate of articles M to the second conveyer 31B and hence to the dispersion feeder 32.

In this manner, excess/deficient conditions of articles M on the dispersion feeder 32, which could not be determined accurately by the prior art method relying upon a photosensor, can be detected reliably and, since the amount of articles M on the dispersion feeder 32 can be maintained at a specified level, the supply rates of the articles M to the weigh hoppers $36_i$ can be kept at an appropriate level. This, too, serves to prevent the occurrence of weigh hoppers $36_i$ which cannot participate in combinational calculations.

Although the present invention has been described above with reference to a weigher which serves to combine the weight values of the articles M obtained by the individual weighing devices $37_i$ associated with the weigh hoppers $36_i$ for obtaining a combination having a total weight within an allowable range, this is not intended to limit the scope of the invention. When the fluctuations among the individual weights of the articles M are small, the numbers of articles M in each weigh hopper $36_i$ may be calculated by dividing the measured weight values by the average unit weight of the articles M such that a combination may be selected in terms of the total number of articles M in the combination.

Although the use of several fixed television cameras was disclosed above, a single camera may be attached to a rotary means to monitor a plurality of vibratory feeders $33_i$.

In summary, combinational weighers according to the present invention are suited as a means for using a plurality of measuring devices to measure the weights of batches of articles such as candies and vegetables and selecting an appropriate combination within an allowable range on the basis of the results of such measurements. All such modifications and variations of the examples described above, that may be apparent to a person skilled in the art, are intended to be included within the scope of this invention.

What is claimed is:

1. A combinational weigher comprising:

a plurality of supplying means for supplying articles;

a plurality of measuring means for receiving articles individually from said supplying means and measuring said received articles;

a combination calculating means for combining measured values obtained individually by said measuring means and selecting a combination of articles having a total measurement within an allowable range;

means for collecting and discharging said selected articles;

image receiving means for taking in images;

image processing means for obtaining from said images information on conditions of article movements on said supplying means;

a predicting means for making predictions on changes in the supply rates of articles from said supplying means at least on the basis of said obtained conditions of article movements; and parameter control means for changing operating conditions of said supplying means to thereby control changes in the supply rates of articles from said supplying means on the basis of said predictions.

2. The combinational weigher of claim 1 wherein said predicting means makes said predictions on changes in the supply rates from said supplying means on the basis of said obtained conditions of article movements.

3. The combinational weigher of claim 1 wherein said image receiving means include a plurality of cameras each placed beside a corresponding one of said plurality of supplying means and wherein said image processing means include means for recording shape images representing shapes of said plurality of supplying means obtained by said cameras and outlining means for obtaining outlines of articles on said plurality of supplying means as indicating manners in which articles are piled on said supplying means.

4. The combinational weigher of claim 3 wherein said image processing means further include pile detecting means for detecting appearance, movement and disappearance of piles on said plurality of supplying means.

5. A combinational weigher comprising:

a plurality of supplying means for supplying articles;

a plurality of measuring means for receiving articles individually from said supplying means and measuring said received articles;

a combination calculating means for combining measured values obtained individually by said measuring means and selecting a combination of articles having a total measurement within an allowable range;

means for collecting and discharging said selected articles;

image receiving means for taking in images;

image processing means for obtaining from said images information on conditions of article movements on said supplying means;

a predicting means for making predictions on changes in the supply rates of articles from said supplying means at least on the basis of said obtained conditions of article movements; and combination control means for changing the amount of articles discharged per unit time from selected combinations of said measuring means on the basis of said predictions such that changes in supply rate of articles from said supplying means are controlled.

6. The combinational weigher of claim 5 wherein said predicting means makes said predictions on changes in the supply rates from said supplying means on the basis of said obtained conditions of article movements.

7. The combinational weigher of claim 5 wherein said image receiving means include a plurality of cameras each placed beside a corresponding one of said plurality of supplying means and wherein said image processing means include means for recording shape images representing shapes of said plurality of supplying means obtained by said cameras and outlining means for obtaining outlines of articles on said plurality of supplying means as indicating manners in which articles are piled on said supplying means.

8. The combinational weigher of claim 7 wherein said image processing means further include pile detecting means for detecting appearance, movement and disappearance of piles on said plurality of supplying means.

9. A combinational weigher comprising:

a plurality of supplying means for supplying articles;

a plurality of measuring means for receiving articles individually from said supplying means and measuring said received articles;

a combination calculating means for combining measured values obtained individually by said measuring means and selecting a combination of articles having a total measurement within an allowable range;

means for collecting and discharging said selected articles;

image receiving means for taking in images;

image processing means for processing signals based on said images and thereby detecting abnormal conditions in article movement on said supplying means; and parameter control means for changing operating conditions of any of said supplying means on which said abnormal conditions were detected such that said abnormal conditions are eliminated.

10. The combinational weigher of claim 9 wherein said images are two-dimensional images and said image processing means serve to process signals representing two-dimensional images.

11. A combinational weigher comprising:

a plurality of supplying means for supplying articles;

a plurality of measuring means for receiving articles individually from said supplying means and measuring said received articles;

a combination calculating means for combining measured values obtained individually by said measuring means and selecting a combination of articles having a total measurement within an allowable range;

means for collecting and discharging said selected articles;

image receiving means for taking in images;

image processing means for processing signals based on said images and thereby detecting abnormal conditions in article movement on said supplying means; and combination control means for changing the amount of articles discharged per unit time from selected combinations of said measuring means such that said abnormal conditions are eliminated.

12. The combinational weigher of claim 11 wherein said images are two-dimensional images and said image processing means serve to process signals representing two-dimensional images.

13. A combinational weigher comprising:

a plurality of supplying means for supplying articles;

a plurality of measuring means for receiving articles individually from said supplying means and measuring said received articles;

a combination calculating means for combining measured values obtained individually by said measuring means and selecting a combination of articles having a total measurement within an allowable range;

means for collecting and discharging said selected articles;

image receiving means for taking in images;

image processing means for detecting densities of articles on said supplying means on the basis of image signals from said image receiving means; and combination control means for changing operating conditions of said supplying means on the basis of said detected densities.

14. The combinational weigher of claim 13 wherein said image receiving means include a camera for taking in images of surface areas of all of said plurality of supplying means, and wherein said image processing means include means for receiving images from said camera and calculating therefrom total surface areas of said supplying means and uncovered areas of said supplying means not covered with said articles, said densities being calculated from said total surface areas and said uncovered areas.

15. A combinational weigher comprising:

a plurality of supplying means for supplying articles;

a plurality of measuring means for receiving articles individually from said supplying means and measuring said received articles;

a combination calculating means for combining measured values obtained individually by said measuring means and selecting a combination of articles having a total measurement within an allowable range;

means for collecting and discharging said selected articles;

image receiving means for taking in images;

image processing means for detecting densities of articles on said supplying means on the basis of image signals from said image receiving means; and combination control means for changing the amount of articles discharged per unit time from selected combinations of said measuring means corresponding to said supplying means on the basis of said detected densities.

16. The combinational weigher of claim 15 wherein said image receiving means include a camera for taking in images of surface areas of all of said plurality of supplying means, and wherein said image processing means include means for receiving images from said camera and calculating therefrom total surface areas of said supplying means and uncovered areas of said supplying means not covered with said articles, said densities being calculated from said total surface areas and said uncovered areas.

17. A combinational weigher comprising:

a dispersion feeder for having articles dropped thereonto from a supplying means and dispersing said dropped articles radially;

a plurality of measuring means disposed in a circle for measuring said articles received thereby;

a plurality of vibratory feeders disposed radially corresponding to said measuring means for delivering said articles from said dispersion feeder individually to said measuring means;

a combination calculating means for combining measured values obtained individually by said measuring means and selecting a combination of articles having a total measurement within an allowable range;

image receiving means for taking in images of at least either said dispersion feeder or the articles on said dispersion feeder;

image processing means for receiving said images from said image receiving means and thereby obtaining information on unevenness of said articles on said dispersion feeder; and dropping point control means for adjusting, on the basis of said obtained information on unevenness, the dropping position at which said articles are dropped on said dispersion feeder.

18. The combinational weigher of claim 17 wherein said image processing means includes outlining means for obtaining an outline which indicates the manner in which said articles are piled on said dispersion feeder and unevenness detecting means for calculating areas on the left-hand and right-hand sides under said outline.

* * * * *